Dec. 13, 1955  A. C. HEMPEL  2,726,418
BATH IMPLEMENT
Filed Oct. 24, 1950
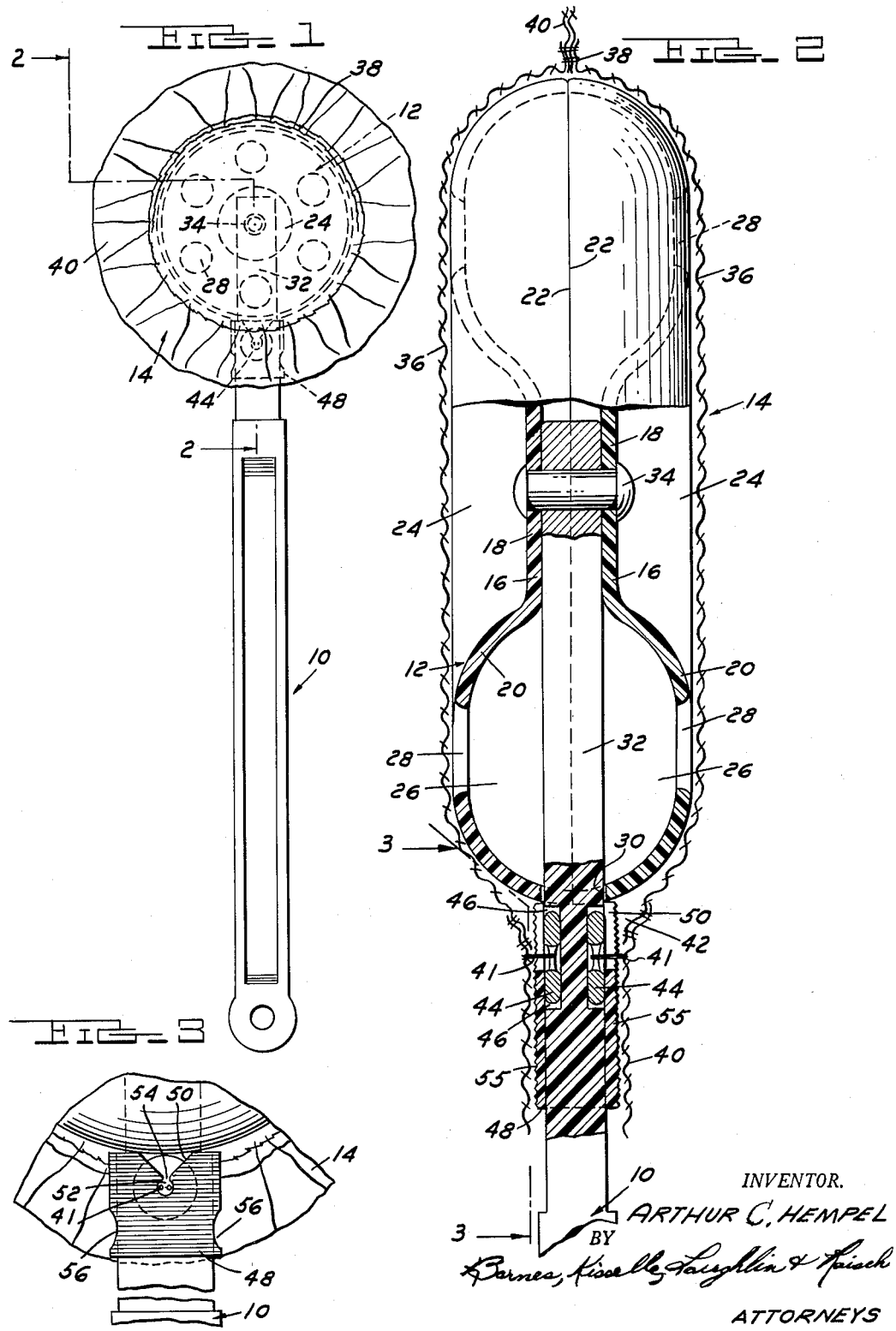
INVENTOR.
ARTHUR C. HEMPEL
BY
Barnes, Kisselle, Laughlin & Raisch
ATTORNEYS

United States Patent Office 2,726,418
Patented Dec. 13, 1955

2,726,418

BATH IMPLEMENT

Arthur C. Hempel, Detroit, Mich.

Application October 24, 1950, Serial No. 191,855

13 Claims. (Cl. 15—210)

This invention relates to a bath implement.

It is an object of this invention to provide a bath implement which is simple in its construction, economical to produce, and which at the same time is constructed so as to be capable of producing the desired scrubbing and wiping action on the body without the harshness that is commonly encountered with scrubbing brushes. The present invention provides a bath implement which is considered an improvement over the bath implement disclosed in applicant's U. S. Patent No. 2,580,226.

In the drawings:

Fig. 1 is a plan view of the implement.

Fig. 2 is an enlarged sectional view taken along the lines 2—2 in Fig. 1.

Fig. 3 is a fragmentary detailed section taken along the lines 3—3 in Fig. 2.

The bath implement of this invention generally comprises a handle 10 having supported at one end thereof a generally circular hollow member 12 which is enclosed within a cover 14. The member 12 is formed as a pair of complementary half sections 16 of identical size and shape. Each section 16 is circular and is fashioned with a recessed wall portion 18 at the center thereof and with raised annular wall portions 20 surrounding the portion 18 of somewhat semielliptical shape in section. The sections 16 are formed of a material which is somewhat soft and pliable and at the same time self-supporting, such as thin plastic or semi-hard rubber. The two sections 16 are positioned with their corresponding edges 22 cooperating to form the hollow member 12. The recessed wall portions 18 provide depressions or pockets 24 on opposite faces of the member 12 and the annular wall portions 20 cooperate to provide an annular tubular portion 26. The annular wall portions 20 are provided with circumferentially spaced apertures 28 on each face of member 12 so that water may pass freely into and out of the tubular portion 26. The edges 22 are merely positioned one against the other and are not intended to form a seal around the periphery of the hollow member 12.

The hollow member 12 is provided with an opening 30 spaced medially between the upper and lower faces of the member. Opening 30 is shaped to receive the shank portion 32 of handle 10. The shank portion 32 is rectangular in cross section and dimensioned in thickness to fit nicely between the recessed wall portions 18 and is secured thereto by suitable means such as a rivet 34. Rivet 34, it will be noted, secures the handle to the hollow member 12 and secures the two half sections together.

Cover 14 is preferably fashioned as two circular fabric pads 36 which are sewed together as at 38 along a line spaced circumferentially inwardly of the outer edge of the pads 36 and approximately half way around the pads. The radius of stitching 38 corresponds generally with the radius of hollow member 12 so that the two pads form a pocket into which the hollow member may be inserted. The outer edge portions of cover 14 form a circumferential flap 40 which drapes freely around the member 12.

Cover 14 may be attached to the implement by any suitable means, but I prefer to use the method of attachment illustrated in Figs. 2 and 3. It will be noted that stitching 38 extends only half way around member 12 so as to provide an opening 42 through which the member 12 may be inserted. This opening is closed and the cover 14 is held on the member 12 by buttons 44 which are sewed to the inside faces of flaps 40 by means of shanks or threads 41. Buttons 44 are positioned to overlie shank 32 of handle 10. The opposite faces of shank 32 are fashioned with recesses or sockets 46 in which the buttons 44 may be seated. The buttons 44 may be formed of any non-corrosive material such as pearl, aluminum, etc. and the sockets 46 have a depth such that when the buttons are seated in the sockets the outer face of each button is substantially flush with the corresponding face of shank 32. The buttons 44 are arranged to be retained in sockets 46 by a sleeve 48 which is slidably arranged on shank 32. Sleeve 48 has grooves on opposite faces thereof. Each groove comprises a tapering entrance portion 50 which extends to the edge of sleeve 48 adjacent hollow member 12 and a retaining socket 52. The gap 54 between the entrance portion 50 and the retaining socket 52 of the groove has a width slightly less than the shank formed by the threads 41. Sleeve 48 is also provided at each side thereof with notches 56 which facilitate gripping the sleeve with the fingers for shifting the sleeve on shank 32 toward and away from hollow member 12.

When it is desired to use the implement, cover 14 is slipped over hollow member 12 and with the forefinger and thumb of one hand on the outer faces of flap 40 the buttons 44 are seated within the sockets 46. The sleeve 48 is then gripped with the other hand at the notches 56 and shifted on shank 32 in a direction toward hollow member 12 so that the entrance portion 50 of the slots therein engage the threads 41. Gap 54 compresses the threads 41 together so that the sleeve 48 may be shifted to its locked position wherein the threads 41 are disposed within the retaining socket 52. Since the gap 54 is of less width than the shank formed by the threads, sleeve 48 tends to remain in the locked position. Sleeve 48 may, if desired, be corrugated as at 55 to further insure its retention in the locked position. Cover 14 may be removed from the implement by simply grasping sleeve 48 with one hand and the flap 40 at a point diametrically opposed to buttons 44 with the other hand and pulling in opposite directions. Threads 41 are disengaged from the retaining socket 52 and entrance slot 50 and, at the same time, cover 14 is withdrawn from member 12. It will be noted that in the locked position sleeve 48 is completely concealed by flaps 40 so that a pleasing appearance is presented.

The bath implement herein described possesses several features which I consider highly desirable. In the first place, the cover 14 which can be readily removed and replaced has a wash-cloth-like surface and does not possess the harshness of bristles commonly found on bath brushes. Furthermore, the circumferential flap 40 which overhangs the member 12 tends to hug the body contour and thereby produces an efficient wiping action much in the same manner as when a conventional wash cloth is used. I have found that this overhanging flap portion is very desirable from this standpoint. The hollow member 12, with its circular shape and rounded contour, is especially adapted to be used on portions of the body, such as under the arms, etc., which would ordinarily be unaccessible by flat faces of a scrub brush or the like. The tubular portion 26 of the member 12, in combination with the apertures 28, provides a means for, temporarily at least, holding water so that when the implement is dipped the tubular portion 26 fills with water and when it is manipulated over the body the water flows out and rinses the body portions being washed. In addition, the recesses 24 on each face of the member 12 provide pockets in which a cake of soap may be retained so that soaping and scrubbing can be performed simultaneously.

I claim:

1. A bath implement comprising a pair of complementary half sections generally circular in shape and each having a circumferential free edge, said sections each presenting a depressed wall portion at the central portion thereof and an annular raised wall portion surrounding said depression and terminating in said circumferential free edge, said sections being juxtaposed with said free edges adjacently positioned in non-sealing relation to form a generally hollow member of circular shape with the depressed wall portions forming depressions on the outer opposite faces of said hollow member, a handle member projecting into said hollow member between said half sections and connected with said depressed wall portions, and an outer fabric cover removably enclosing said hollow member, said half sections being sufficiently self-supporting to enable use of the implement in the manner of a bath brush.

2. The combination set forth in claim 1 wherein said raised annular portions are generally convex outwardly and have their corresponding edges adjacently positioned to provide a generally convex peripheral contour around said hollow member.

3. A bath implement comprising a pair of complementary half sections generally circular in shape, said sections each having a depressed wall portion at the central portion thereof and an annular raised wall portion surrounding said depression, said sections being juxtaposed to form a generally hollow member of circular shape with the depressed wall portions forming depressions on the outer opposite faces of said hollow member, a handle member projecting into said hollow member between said half sections and connected with said depressed wall portions, and an outer fabric cover removably enclosing said hollow member, said raised annular portions cooperating to provide a hollow endless tubular section and being apertured to permit said tubular section to be readily filled with or discharged of water.

4. The combination set forth in claim 1 wherein said fabric cover is provided with a circumferential flat portion of circular shape which extends loosely outwardly beyond the periphery of said circular hollow member.

5. The combination set forth in claim 1 wherein said fabric cover overlies said depressions on opposite faces of said hollow member and cooperates therewith to form hollow pockets.

6. The combination set forth in claim 3 wherein said cover is provided with an opening adjacent said handle, said opening being of a size sufficient to receive said hollow member, and means for removably securing the portions of said cover adjacent said opening to said handle member.

7. A bath implement comprising a generally circular hollow member, a handle secured to said member and extending radially thereof, a cover enclosing said hollow member, said cover having an opening therein through which said hollow member may be inserted with the handle projecting outwardly through said opening, said opening providing a pair of opposed flaps overlying a portion of said handle member, and means for closing said opening after the hollow member has been inserted therein comprising a pair of button members one each secured to the inside of one of said flap portions, a pair of recesses on opposite faces of said handle member in which said buttons are adapted to be seated, and a sleeve on said handle member shiftable in a direction toward said hollow member to engage and retain said button members in said recesses.

8. The combination set forth in claim 7 wherein said button members are secured to said flap portions by shank members which are of less width than said button members, said sleeve having slots therein positioned to receive said shank when the sleeve is shifted toward said hollow member with the button members seated in said recesses.

9. The combination set forth in claim 7 wherein said button members are sewed at their central portion to said flap portions, said sleeve having longitudinal slots therein terminating in a retaining socket, said slots having a portion thereof adjacent said retaining sockets of less width than the shank formed by the stitching between said button members and said flap portions.

10. The combination set forth in claim 7 wherein said flap portions are dimensioned to overlie and conceal said sleeve when the sleeve is shifted to said position engaging and retaining said button members in said recesses.

11. A bath implement comprising a pair of complementary half sections generally circular in shape, said sections each having a depressed wall portion at the central portion thereof and an annular raised wall portion surrounding said depression, said sections being juxtaposed to form a generally hollow member of circular shape with the depressed wall portions forming depressions on the outer opposite faces of said hollow member, a handle member projecting into said hollow member between said half sections and connected with said depressed wall portions, an outer fabric cover enclosing said hollow member, said cover having an opening therein to receive said hollow member, and quickly detachable means on said cover for closing said opening and thereby retaining said cover on said hollow member.

12. The combination set forth in claim 11 including a sleeve slidable on said handle toward and away from said hollow member, and means on said sleeve for engaging said quickly detachable means on said cover.

13. A bath implement comprising a pair of complementary half sections generally circular in shape, said half sections being juxtaposed to provide a hollow member of circular shape, said half sections forming opposite walls of said hollow member, said hollow member having central depressions on the opposite faces thereof, said half sections being of arcuate contour and having their corresponding edges adjacently positioned so that the outer edge surface portions of said hollow member are generally outwardly convex in a plane normal to said circumferential contour, a handle member projecting radially inwardly of said hollow member and terminating at said central depressions, a cover enclosing said hollow member, and means passing through the inner end of said handle and the wall portions of said hollow member forming said depressions for securing said half sections to each other and to said handle.

References Cited in the file of this patent

UNITED STATES PATENTS

| | | |
|---|---|---|
| 1,564,219 | Drueding | Dec. 8, 1925 |
| 2,384,178 | Kincaid | Sept. 4, 1945 |
| 2,580,226 | Hempel | Dec. 25, 1951 |